(12) United States Patent
Huang et al.

(10) Patent No.: US 8,891,487 B2
(45) Date of Patent: *Nov. 18, 2014

(54) APPARATUS, METHOD AND COMPUTER PROGRAM PRODUCT PROVIDING EXTENDED MEASUREMENT CONTROL SIGNAL FOR HANDOFF MEASUREMENT UNDER INTERFERENCE COORDINATION

(75) Inventors: Leping Huang, Kawaguchi (JP); Kodo Shu, Kawasaki (JP); Hongyuan Chen, Tokyo (JP); Sari Kaarina Nielsen, Espoo (FI); Lars Dalsgaard, Oulu (FI); Jarkko T. Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 254 days.

This patent is subject to a terminal disclaimer.

(21) Appl. No.: 13/609,372

(22) Filed: Sep. 11, 2012

(65) Prior Publication Data

US 2013/0003707 A1 Jan. 3, 2013

Related U.S. Application Data

(63) Continuation of application No. 11/977,663, filed on Oct. 25, 2007, now Pat. No. 8,300,596.

(51) Int. Cl.
*H04W 36/00* (2009.01)
*H04W 24/10* (2009.01)

(52) U.S. Cl.
CPC .......... *H04W 36/0088* (2013.01); *H04W 24/10* (2013.01)
USPC .......................................... 370/331; 455/436

(58) Field of Classification Search
None
See application file for complete search history.

(56) References Cited

U.S. PATENT DOCUMENTS

| | | | |
|---|---|---|---|
| 5,960,354 A | 9/1999 | Einola | 455/454 |
| 6,615,044 B2 | 9/2003 | Tigerstedt et al. | 455/437 |
| 6,970,708 B1 | 11/2005 | Raith | 455/440 |
| 7,289,803 B1 | 10/2007 | Benveniste et al. | 455/423 |
| 7,349,439 B2 | 3/2008 | Lakkis | 370/480 |
| 7,515,928 B2 | 4/2009 | Kang | 455/525 |
| 7,636,571 B2 | 12/2009 | Lee et al. | 455/437 |
| 7,734,255 B2 | 6/2010 | Matsunaga | 455/63.1 |
| 7,796,997 B2 | 9/2010 | Kim et al. | 455/450 |
| 2002/0147024 A1 | 10/2002 | Wan | 455/515 |
| 2005/0075110 A1 | 4/2005 | Posti et al. | 455/452.1 |

(Continued)

FOREIGN PATENT DOCUMENTS

| | | |
|---|---|---|
| EP | 1037477 A1 | 9/2000 |
| EP | 1 594 330 A1 | 11/2005 |

(Continued)

OTHER PUBLICATIONS

"Scheduling Based Controllable Interference Coordination in OFDMA Systems", Renshui Zhu, et al., IEEE 2006, 5 pgs.

(Continued)

*Primary Examiner* — Robert C Scheibel
(74) *Attorney, Agent, or Firm* — Harrington & Smith

(57) ABSTRACT

In one non-limiting, exemplary embodiment, a method includes: receiving radio resource control signaling with a user equipment, wherein the radio resource control signaling is indicative of at least one frequency sub-band to be measured by the user equipment for a particular cell in a manner transparent to at least one of an interference control scheme and a handover scheme implemented for the cell; performing at least one measurement of the at least one frequency sub-band; and reporting information descriptive of the at least one measurement.

18 Claims, 11 Drawing Sheets

(56) References Cited

U.S. PATENT DOCUMENTS

| | | |
|---|---|---|
| 2005/0176468 A1 | 8/2005 | Iacono et al. ............... 455/562.1 |
| 2005/0249322 A1 | 11/2005 | Gerlach ........................ 375/355 |
| 2005/0271012 A1 | 12/2005 | Agrawal et al. ............... 370/331 |
| 2006/0003767 A1 | 1/2006 | Kim et al. ..................... 455/436 |
| 2006/0014538 A1 | 1/2006 | Yuan ............................. 455/436 |
| 2006/0135075 A1 | 6/2006 | Tee et al. .................... 455/67.13 |
| 2006/0135164 A1 | 6/2006 | Kim et al. ..................... 455/436 |
| 2007/0207828 A1 | 9/2007 | Cheng et al. .................. 455/522 |
| 2008/0056117 A1 | 3/2008 | Muharemovic et al. ...... 370/203 |
| 2008/0123616 A1 | 5/2008 | Lee ............................... 370/344 |
| 2008/0146231 A1 | 6/2008 | Huang et al. .................. 455/436 |
| 2009/0028260 A1 | 1/2009 | Xiao et al. ..................... 375/260 |

FOREIGN PATENT DOCUMENTS

| | | |
|---|---|---|
| EP | 1 608 197 A1 | 12/2005 |
| EP | 1 657 945 A2 | 5/2006 |
| WO | WO 96/37084 A | 11/1996 |
| WO | WO-2006/077450 A1 | 7/2006 |
| WO | WO-2008/050230 A3 | 5/2008 |

OTHER PUBLICATIONS

3GPP TS 25.331 version 7.2.0 Release 7; Universal Mobile Telecommunications System (UMTS); Radio Resource Control (RRC); Protocol specification; ETSI TS 125 331, vol. 3-R2, No. V7.2.0, Sep. 1, 2006, XP014035587; paragraph 8.1.1.6.11-paragraph 8.1.1.6.12; paragraph 08.4; paragraph 8.6.7; paragraph 10.1; paragraph 10.2.17; paragraph 10.3.7; paragraph 0014.

3GPP: 3GPP TR 25.913 v7.3.0, Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7) Apr. 1, 2006, 3rd Generation Partnership Project (3GPP) Technical Report, vol. 25.813, No. V0.8.3, pp. 1-33.

MEASUREMENT CONTROL, NORMAL CASE

MEASUREMENT CONTROL, FAILURE CASE 10.3.7.2 CELL INFO
INCLUDES NON-FREQUENCY RELATED CELL INFO USED IN THE IE "INTER-FEQUENCY CELL INFO LIST" AND "INTRA-FREQUENCY CELL INFO LIST"

| INFORMATION ELEMENT/GROUP NAME | NEED | MULTI | TYPE AND REFERENCE | SEMANTICS DESCRIPTION |
|---|---|---|---|---|
| Cell Individual offset | MD | | Real (-10..10 by step of 0.5) | In dB<br>Default value is 0 dB<br>Used to offset measured quantity value |
| Reference time difference to cell | OP | | Reference time difference to cell 10.3.7.60 | In chips<br>This IE is absent for serving cell |
| Read SFN indicator | MP | | Boolean | TRUE indicates that read of SFN is requested for the target cell |
| CHOICE *mode* | MP | | | |
| >FDD | | | | |
| >>Primary CPICH Info | OP | | Primary CPICH Info 10.3.6.60 | This IE is absent only if measuring RSSI only (broadband measurement) |
| >>Primary CPICH Tx power | OP | | Primary CPICH Tx power 10.3.6.61 | Required if calculating pathloss |
| >>TX Diversity Indicator | MP | | Boolean | TRUE indicates that transmit diversity is used |
| >TDD | | | | |
| >>Primary CCPCH Info | MP | | Primary CCPCH Info 10.3.6.57 | |
| >>Primary CCPCH Tx power | OP | | Primary CCPCH Tx power 10.3.6.59 | |
| >>Timeslot list | OP | | 1 to <maxTS> | The UE shall report Timeslot ISCP values according the orders of the listed Timeslot numbers |

FIG.2A-1

| >>>CHOICE *TDD option* | MP | | |
|---|---|---|---|
| >>>> 3.84 Mcps TDD | | | |
| >>>>>Timeslot number | MP | Integer (0.., 14) | Timeslot numbers, for which the UE shall report Timeslot ISCP |
| >>>>>Burst Type | MD | Enumerated (Type1, Type2) | Use for Timeslot ISCP measurements only. Default value is "Type1" |
| >>>> 7.68 Mcps TDD | | | |
| >>>>>Timeslot number | MP | Integer (0.., 14) | Timeslot numbers, for which the UE shall report Timeslot ISCP |

| >>>>>Burst Type | MD | Enumerated (Type1, Type2) | Use for Timeslot ISCP measurements only. Default value is "Type1" |
|---|---|---|---|
| >>>> 1.28 Mcps TDD | | | |
| >>>>>Timeslot number | MP | Integer (0.., 6) | Timeslot numbers, for which the UE shall report Timeslot ISCP |
| Cell Selection and Re-selection Info | CV-*BCHopt* | Cell Selection and Re-selection for SIB 11/12 info 10.3.2.4. | This IE is absent for the serving cell |

| CONDITION | EXPLANATION |
|---|---|
| *BCHopt* | This IE is Optional when sent in SYSTEM INFORMATION. Otherwise, the IE is not needed |

FIG.2A-2

| FIG.2A-1 |
|---|
| FIG.2A-2 |

10.3.7.33 INTRA-FREQUENCY CELL INFO LIST
CONTAINS THE INFORMATION FOR THE LIST OF MEASUREMENT OBJECTS FOR AN
INTRA-FREQUENCY MEASUREMENT

| INFORMATION ELEMENT/GROUP NAME | NEED | MULTI | TYPE AND REFERENCE | SEMANTICS DESCRIPTION |
|---|---|---|---|---|
| CHOICE *intra-frequency cell removal* | OP | | | Absence of this IE is equivalent to choice "Remove no intra-frequency cells" |
| >Remove all intra-frequency cells | | | | No data |
| >Remove some intra-frequency cells | | | | |
| >>Removed intra-frequency cells | MP | 1 to <maxCellMeas> | | |
| >>>Intra-frequency cell id | MP | | Integer(0 .. <maxCellMeas>-1) | |
| >Remove no intra-frequency cells | | | | |
| New intra-frequency cells | OP | 1 to <maxCellMeas> | | This information element must be present when "Intra-frequency cell info list" is included in the system information |
| >Intra-frequency cell id | OP | | Integer(0 .. <maxCellMeas>-1) | |
| >Cell info | MP | | Cell info 10.3.7.2 | This IE must be included for the serving cell when the IE "Intra frequency cell info list" is included in System Information Block type11 |
| Cells for measurement | CV-BCHopt | 1 to <maxCellMeas> | | |
| >Intra-frequency cell id | MP | | Integer(0 .. <maxCellMeas>-1) | |

| CONDITION | EXPLANATION |
|---|---|
| BCHopt | This IE is not needed when sent in SYSTEM INFORMATION. Otherwise, the IE is Optional |

FIG.2B 10.3.7.36  INTRA-FREQUENCY MEASUREMENT

| INFORMATION ELEMENT/GROUP NAME | NEED | MULTI | TYPE AND REFERENCE | SEMANTICS DESCRIPTION |
|---|---|---|---|---|
| Intra-frequency measurement objects list | OP | | Intra-frequency cell info list 10.3.7.33 | |
| Intra-frequency measurement quantity | OP | | Intra-frequency measurement quantity 10.3.7.38 | |
| Intra-frequency reporting quantity | OP | | Intra-frequency reporting quantity 10.3.7.41 | |
| Reporting cell status | CV-reporting | | Reporting cell status 10.3.7.61 | |
| Measurement validity | OP | | Measurement validity 10.3.7.51 | |
| CHOICE *reporting criteria* | OP | | | |
| >Intra-frequency measurement reporting criteria | | | Intra-frequency measurement reporting criteria 10.3.7.39 | |
| >Periodical reporting criteria | | | Periodical reporting criteria 10.3.7.53 | |
| >No reporting | | | | (no data) Chosen when this measurement only is used as additional measurement to another measurement |

| CONDITION | EXPLANATION |
|---|---|
| *reporting* | This IE is optional if the CHOICE "report criteria" is equal to "periodical reporting criteria" or "No reporting", otherwise the IE is not needed |

FIG.2C 10.3.7.13 INTER-FREQUENCY CELL INFO LIST
CONTAINS THE INFORMATION FOR THE LIST OF MEASUREMENT OBJECTS FOR AN
INTER-FREQUENCY MEASUREMENT

| INFORMATION ELEMENT/GROUP NAME | NEED | MULTI | TYPE AND REFERENCE | SEMANTICS DESCRIPTION |
|---|---|---|---|---|
| CHOICE *inter-frequency cell removal* | OP | | | |
| >Remove all inter-frequency cells | | | | No data |
| >Remove some inter-frequency cells | | | | |
| >>Remove inter-frequency cells | MP | 1 to <maxCellMeas> | | |
| >>>Inter-frequency cell id | MP | | Integer(0 .. <maxCellMeas>-1) | |
| >No inter-frequency cells removed | | | | No data |
| New inter-frequency cells | OP | 1 to <maxCellMeas> | | |
| >Inter-frequency cell id | MD | | Integer(0 .. <maxCellMeas>-1) | |
| >Frequency info | MD | | Frequency info 10.3.6.36 | Default value is the value of the previous "frequency Info" in the list. NOTE: The first occurrence is then MP |
| >Cell info | MP | | Cell info 10.3.7.2 | |
| Cells for measurement | CV-*BCHopt* | 1 to <maxCellMeas> | | |
| >Inter-frequency cell id | MP | | Integer(0 .. <maxCellMeas>-1) | |

| CONDITION | EXPLANATION |
|---|---|
| *BCHopt* | This IE is not needed when sent in SYSTEM INFORMATION. Otherwise, the IE is Optional |

FIG.2D 10.3.7.47  MEASUREMENT CONTROL SYSTEM INFORMATION

| INFORMATION ELEMENT/GROUP NAME | NEED | MULTI | TYPE AND REFERENCE | SEMANTICS DESCRIPTION |
|---|---|---|---|---|
| Use of HCS | MP | | Enumerated (Not used, used) | Indicates if the serving cell belongs to a HCS structure |
| Cell selection and reselection quality measure | MP | | Enumerated (CPICH Ec/N0, CPICH RSCP) | Choice of measurement (CPICH Ec/N0 or CPICH RSCP) to use as quality measure Q.<br>NOTE: For TDD, each choice of this parameter represents PCCPCH RSCP |
| Intra-frequency measurement system information | OP | | Intra-frequency measurement system information 10.3.7.40 | |
| Inter-frequency measurement system information | OP | | Inter-frequency measurement system information 10.3.7.20 | |
| Inter-RAT measurement system information | OP | | Inter-RAT measurement system information 10.3.7.31 | |
| Traffic volume measurement system information | OP | | Traffic volume measurement system information 10.3.7.73 | |

FIG.2E

| INFORMATION ELEMENT/GROUP NAME | NEED | MULTI | TYPE AND REFERENCE | SEMANTICS DESCRIPTION | VERSION |
|---|---|---|---|---|---|
| >LTE-FDD | | | | | |
| >>Primary CPICH Info | OP | | Primary CPICH Info 10.3.6.60 | This IE is absent only if measuring RSSI only (broadband measurement) | |
| >>Primary CPICH Tx power | OP | | Primary CPICH Tx power 10.3.6.61 | Required if calculating pathloss | |
| >>TX Diversity Indicator | MP | | Boolean | TRUE indicates that transmit diversity is used | |
| >>SubBandInfo | MP | | List of SubBand to Measure | | |

FIG.6A

| INFORMATION ELEMENT/GROUP NAME | NEED | MULTI | TYPE AND REFERENCE | SEMANTICS DESCRIPTION | VERSION |
|---|---|---|---|---|---|
| FirstResourceBlockNumber | MD | | Integer | | |
| ResourceBlockStep | MD | | Integer | | |
| LastResourceBlockNumber | MD | | Integer | | |

FIG.6B

| INFORMATION ELEMENT/GROUP NAME | NEED | MULTI | TYPE AND REFERENCE | SEMANTICS DESCRIPTION | VERSION |
|---|---|---|---|---|---|
| FirstResourceBlockNumber | MD | | Integer | Indicates the start block of the assigned band | |
| ResourceBlockAmount | MD | | Integer | Indicates the amount of blocks in the assigned band | |

Note: blocks here refer to blocks as illustrated in figure 4

FIG.6C

APPARATUS, METHOD AND COMPUTER PROGRAM PRODUCT PROVIDING EXTENDED MEASUREMENT CONTROL SIGNAL FOR HANDOFF MEASUREMENT UNDER INTERFERENCE COORDINATION

CROSS-REFERENCE TO RELATED APPLICATIONS

This patent application is a continuation of U.S. patent application Ser. No. 11/977,663, filed Oct. 25, 2007, now U.S. Pat. No.: 8,300,596.

TECHNICAL FIELD

The exemplary and non-limiting embodiments of this invention relate generally to wireless communication systems, methods, devices and computer program products and, more specifically, relate to techniques to provide measurements used for, as examples, handover, cell reselection and interference control.

BACKGROUND

Various abbreviations found in the specification are defined as follows:
3GPP third generation partnership project
BW bandwidth
CQI cell quality indicator
DL downlink (Node B to UE)
eNB evolved Node-B
E-UTRA evolved universal terrestrial radio access
E-UTRAN evolved universal terrestrial radio access network
FDD frequency division duplex
HO handover
IC interference control
L1 layer 1 (physical layer)
LTE long term evolution (of UTRAN)
Node-B base station
OFDMA orthogonal frequency division multiple access
RAN radio access network
RAT radio access technology
RB resource block
RRC radio resource control
SI system information
SIB system information block
TDD time division duplex
UE user equipment
UL uplink (UE to Node B)
UTRA universal terrestrial radio access
UTRAN universal terrestrial radio access network A proposed communication system known as evolved UTRAN (E-UTRAN, also referred to as UTRAN-LTE or as 3.9G/LTE) is currently under discussion within the 3GPP. The current working assumption is that the DL access technique will be OFDMA, and the UL technique will be SC-FDMA.

E-UTRAN is a packet-data-based transmission system that supports intra-frequency, inter-frequency and inter-RAT handovers (also referred to as serving frequency layer, non-serving frequency layer and inter-RAT handovers). Typically, for supporting mobility the UE periodically measures the power of the pilot channel of different cells. In general, if the measurement results between a current serving cell and a neighboring cell satisfy certain criteria, the UE is handed over to the neighboring cell. One important requirement of pilot measurements for handover and cell reselection purposes is that the measurement results of different cells are comparable.

Interference control is a scheme to improve the cell-edge performance of E-UTRAN, which intends to mitigate the inter-cell interference under a frequency reuse-1 constraint.

As may be appreciated, an ability to make accurate and meaningful measurements is important to achieve reliable HOs.

SUMMARY

In one non-limiting, exemplary embodiment, a method comprising: receiving radio resource control signaling with a user equipment, wherein the radio resource control signaling is indicative of at least one frequency sub-band to be measured by the user equipment for a particular cell in a manner transparent to at least one of an interference control scheme and a handover scheme implemented for the cell; performing at least one measurement of the at least one frequency sub-band; and reporting information descriptive of the at least one measurement.

In another non-limiting, exemplary embodiment, a computer program product comprising program instructions embodied on a tangible computer-readable medium, execution of the program instructions resulting in operations comprising: receiving radio resource control signaling with a user equipment, wherein the radio resource control signaling is indicative of at least one frequency sub-band to be measured by the user equipment for a particular cell in a manner transparent to at least one of an interference control scheme and a handover scheme implemented for the cell; performing at least one measurement of the at least one frequency sub-band; and reporting information descriptive of the at least one measurement.

In another non-limiting, exemplary embodiment, an apparatus comprising: a receiver configurable to receive radio resource control signaling indicative of at least one frequency sub-band to be measured by the apparatus for a particular cell in a manner transparent to at least one of an interference control scheme and a handover scheme implemented for the cell; a data processor configurable to perform at least one measurement of the at least one frequency sub-band; and a transmitter configurable to report information descriptive of the at least one measurement.

In another non-limiting, exemplary embodiment, an apparatus comprising: means for receiving radio resource control signaling indicative of at least one frequency sub-band to be measured by the apparatus for a particular cell in a manner transparent to at least one of an interference control scheme and a handover scheme implemented for the cell; means for performing at least one measurement of the at least one frequency sub-band; and means for reporting information descriptive of the at least one measurement.

In another non-limiting, exemplary embodiment, a method comprising: transmitting, to a user equipment, radio resource control signaling indicative of at least one frequency sub-band to be measured by the user equipment for a particular cell in a manner transparent to at least one of an interference control scheme and a handover scheme implemented for the cell; and receiving, from the user equipment, information descriptive of at least one measurement performed by the user equipment of the at least one frequency sub-band.

In another non-limiting, exemplary embodiment, a computer program product comprising program instructions embodied on a tangible computer-readable medium, execution of the program instructions resulting in operations comprising: transmitting, to a user equipment, radio resource control signaling indicative of at least one frequency sub-band to be measured by the user equipment for a particular cell in a manner transparent to at least one of an interference control scheme and a handover scheme implemented for the cell; and receiving, from the user equipment, information descriptive of at least one measurement performed by the user equipment of the at least one frequency sub-band.

In another non-limiting, exemplary embodiment, an apparatus comprising: a transmitter configurable to transmit, to a user equipment, radio resource control signaling indicative of at least one frequency sub-band to be measured by the user equipment for a particular cell in a manner transparent to at least one of an interference control scheme and a handover scheme implemented for the cell; and a receiver configurable to receive, from the user equipment, information descriptive of at least one measurement performed by the user equipment of the at least one frequency sub-band.

In another non-limiting, exemplary embodiment, an apparatus comprising: means for transmitting, to a user equipment, radio resource control signaling indicative of at least one frequency sub-band to be measured by the user equipment for a particular cell in a manner transparent to at least one of an interference control scheme and a handover scheme implemented for the cell; and means for receiving, from the user equipment, information descriptive of at least one measurement performed by the user equipment of the at least one frequency sub-band.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 2A reproduces section 10.3.7.2 of 3GPP TS25.331, V7.1.0, and depicts the content of a Cell info message.

FIG. 2B reproduces section 10.3.7.33 of 3GPP TS25.331, V7.1.0, and depicts the content of an Intra-frequency cell info list.

FIG. 2C reproduces section 10.3.7.36 of 3GPP TS25.331, V7.1.0, and depicts the content of an Intra-frequency measurement message.

FIG. 2D reproduces section 10.3.7.13 of 3GPP TS25.331, V7.1.0, and depicts the content of an Inter-frequency cell info list.

FIG. 2E reproduces section 10.3.7.47 of 3GPP TS25.331, V7.1.0, and depicts the content of a Measurement control system information message.

FIGS. 6A, 6B and 6C illustrate non-limiting examples of information element types that may be employed to implement the exemplary embodiments of this invention.

DETAILED DESCRIPTION

The exemplary embodiments of this invention relate to wireless communication systems, such as E-UTRAN, and address the signaling for E-UTRAN UE measurements related at least to handovers, cell reselections and E-UTRAN IC.

The exemplary embodiments of this invention assume, but do not require, that a LTE RAN uses one type of IC scheme characterized by soft frequency reuse with fixed resource portions and power levels. Note that soft frequency reuse IC is generally a popular IC scheme in 3GPP. The exemplary embodiments of this invention further make a non-limiting assumption that a power sequence is applied on DL shared data channels and on L1 pilot channels. As a result, pilot symbols of different frequency sub-bands are transmitted with different powers.

One publication of interest to the ensuing description of the exemplary embodiments of this invention is 3GPP TS 25.331, V7.1.0 (2006-06), "3rd Generation Partnership Project; Technical Specification Group Radio Access Network; Radio Resource Control (RRC); Protocol Specification (Release 7)". FIGS. 1A, 1B, 2A, 2B, 2C, 2D and 2E reproduce various portions of 3GPP TS 25.331, V7.1.0, as detailed above.

Figure 7:
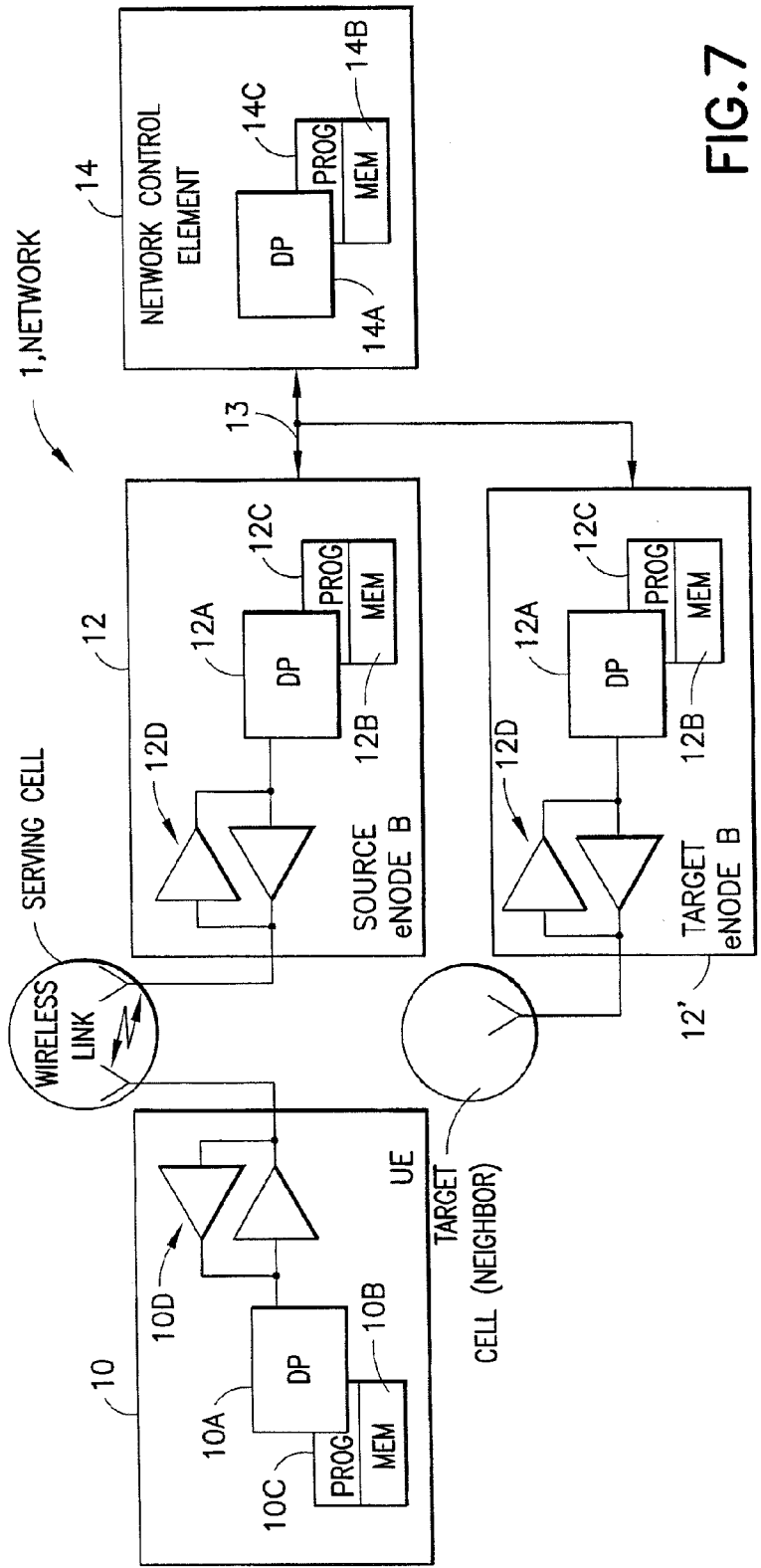
FIG. 7 shows a simplified block diagram of various electronic devices that are suitable for use in practicing the exemplary embodiments of this invention.

Before describing in detail the exemplary embodiments of this invention, reference is made first to FIG. 7 for illustrating a simplified block diagram of various electronic devices that are suitable for use in practicing the exemplary embodiments of this invention. In FIG. 7 a wireless network 1 is adapted for communication with a UE 10 via at least one Node B (base station) 12 (also referred to herein as an eNode B 12 or as an eNB 12). The network 1 may include a network control element 14 coupled to the eNode B 12 via a data link 13. The UE 10 includes a data processor (DP) 10A, a memory (MEM) 10B that stores a program (PROG) 10C, and a suitable radio frequency (RF) transceiver 10D for bidirectional wireless communications with the eNode B 12, which also includes a DP 12A, a MEM 12B that stores a PROG 12C, and a suitable RF transceiver 12D. The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

Shown for completeness in FIG. 7 is at least one second (neighbor) eNode B, referred to as 12'. During a HO event the eNode B 12 may be considered the Source eNode B, i.e., the eNode B to which the UE 10 is currently connected and communicating in the associated serving cell, and the eNode B 12' may be considered the Target eNode B, i.e., the eNode B to which the UE 10 is to be connected and communicating with in the target cell after the HO procedure is completed. Note that in practice the serving cell and the target cell with at least partially overlap one another. The transmission of the neighbor eNode-B 12' is what is measured by the UE 10 prior to a HO event.

In general, the various embodiments of the UE 10 can include, but are not limited to, mobile phones, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention operate to inform the UE 10 of at least the frequency of the HO measurement and the sub-band to measure. By using, for example, RRC signaling from the eNB 12 to the UE 10, this information can be included in an E-UTRA message equivalent to the UTRAN MEASUREMENT CONTROL message (section 8.4.1 of 3GPP TS 25.331, see FIG. 1A herein) or a measurement control system information (section 10.3.7.47 of 3GPP TS 25.331, see FIGS. 1B and 2E herein) contained in a SIB Type 11 or a SIB Type 12. The exemplary embodiments of this invention inform the UE 10 of all necessary measurement requirements under an IC scheme of interest, such as one that provides for different sub-bands for inter-frequency, intra-frequency and different measurement frequency, in a measurement control message. As a result the UE 10 does not necessarily need to understand the IC algorithm or how/if it is used in the network configuration. In other words, the use of the exemplary embodiments of this invention guarantee the measurement activity to be transparent to different IC schemes, including a no-IC scheme, and different HO measurement schemes, and ensures that different UEs behave in a similar manner, and that the measurement activity does not depend on UE 10 implementation and interpretation.

Various situations may trigger the eNB 12 to send a MEASUREMENT CONTROL message to the UE 10. It is also possible or even likely that some level of measurement control is provided in the system information so as to enhance mobility support. In this case the UE 10 can perform measurements of its serving cell level and neighbor cell levels in a regular manner, and at least a portion of the measurement control information may be used both in the idle mode (for cell reselection purposes) and in the active mode (for HO purposes).

The exemplary embodiments of this invention can be realized in several ways. As one non-limiting example, the information needed by the UE 10 for assuring support for possible IC schemes in the network may be added in or distributed with other messages in the cell, such as neighbor list information, for example. As another non-limiting example, in a least complex form the information needed by the UE 10 for assuring support for possible IC schemes in the network may be added in the measurement control message under each cell description. For example, a new sub-band information field (referred to below and in FIGS. 6A-6C as a SubBandInfo information element) may contain information about which band the UE 10 should use for performing a measurement on the particular cell. Thus, in such a case, it would be mandatory for the UE 10 to use the SubBandInfo information element in its measurements.

Figure 4:
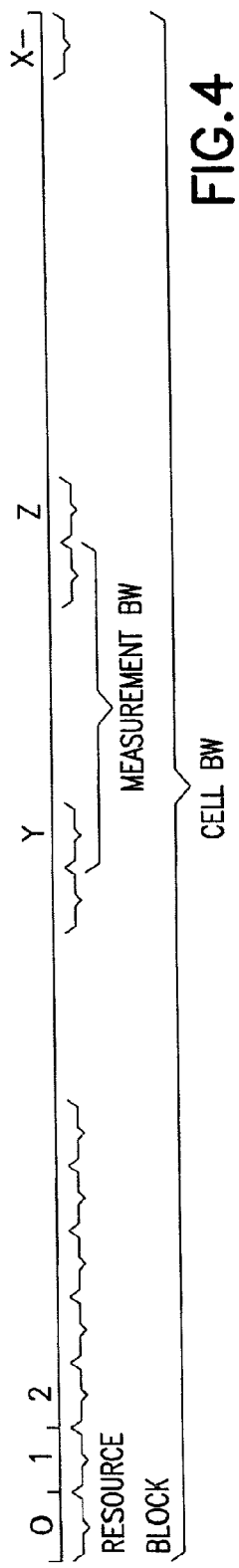
FIG. 4 shows a frequency spectrum and illustrates a basic concept a measurement BW indication.

The basic information needed is placement of the band in the entire bandwidth, and the bandwidth of the sub-band, as shown in FIG. 4. The UE 10 utilizes only pilot sub-carriers within the given sub-band for its measurements. In this example the cell BW may equal 15 MHz, a resource block may have a BW equal to 375 KHz, the number of resource blocks in a cell is equal to cell BW/resource block BW (or 15 MHz/375 KHZ in this example), and the measurement BW is given by the starting resource block over the specified number of resource blocks. In some exemplary embodiments, it may be assumed that the cell BW and resource block BW are known a priori. It should be noted that exemplary embodiments of this invention may provide the identification of the starting resource block and the number of resource blocks to the UE 10, which can be represented as some number (x) bits per cell, leading to an efficient encoding.

Information on the sub-band used for measurements can be indicated both for the serving cell and neighbor cell(s) when intra-frequency or inter-frequency measurements are considered. However, in the case of inter-RAT measurements it may be desirable that only for the serving cell sub-band information be provided.

With reference to 3G specifications as a non-limiting example for implementing the exemplary embodiments of this invention, one may define another choice/type of Cell Info (section 10.3.7.2 of 3GPP TS 25.331, shown in FIG. 2A) for the LTE measurement. This cell info can be included in an intra-frequency cell info list (section 10.3.7.33 of 3GPP TS 25.331, shown in FIG. 2B) or an inter-frequency cell info list (section 10.3.7.13 of 25.331, shown in FIG. 2D), and is part of the MEASUREMENT CONTROL message. Additionally, for inter-RAT measurements it is desirable to define for the serving E-UTRA cell what sub-band to measure. This may employ a modified signaling, as the information would only be valid for the serving cell. The UE 10 follows the information specified in the Cell Info IE to measure the different sub-bands. As an additional non-limiting example, the information may be distributed in or with other messages, such as a neighbor list distribution message in SIB, for example.

There are several possible ways in which to define the SubBandInfo IE. For example, one may define the sub-band to measure by specifying the first and last RB to measure, and the step between first and last RB.

The examples of the SubBandInfo information element shown in FIGS. 6A and 6B are based on examples wherein the UE 10 assigned bands can be distributed in frequency, and not as illustrated in FIG. 4 where the assigned band is continuous in frequency. In this latter case the information element SubBandInfo may be coded as illustrated in FIG. 6C.

Figure 1A:
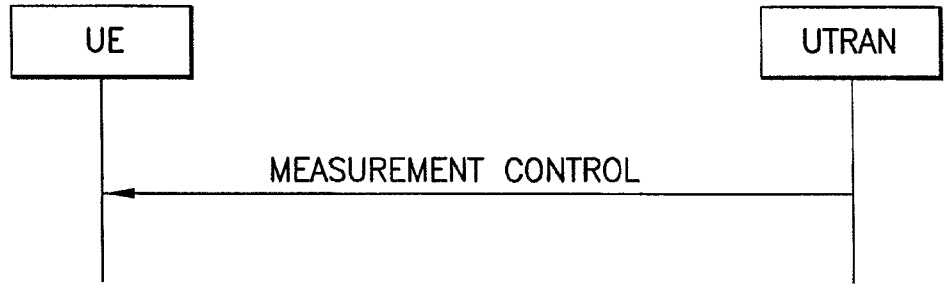
FIG. 1A reproduces FIG. 8.4.1-1 of 3GPP TS25.331, V7.1.0, and depicts Measurement Control, normal case.
Figure 1B:
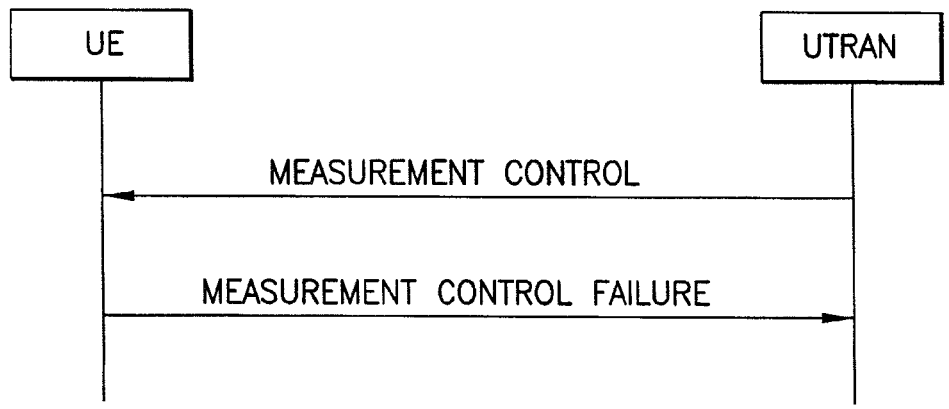
FIG. 1B reproduces FIG. 8.4.1-2 of 3GPP TS25.331, V7.1.0, and depicts Measurement Control, failure case.
Figure 3:
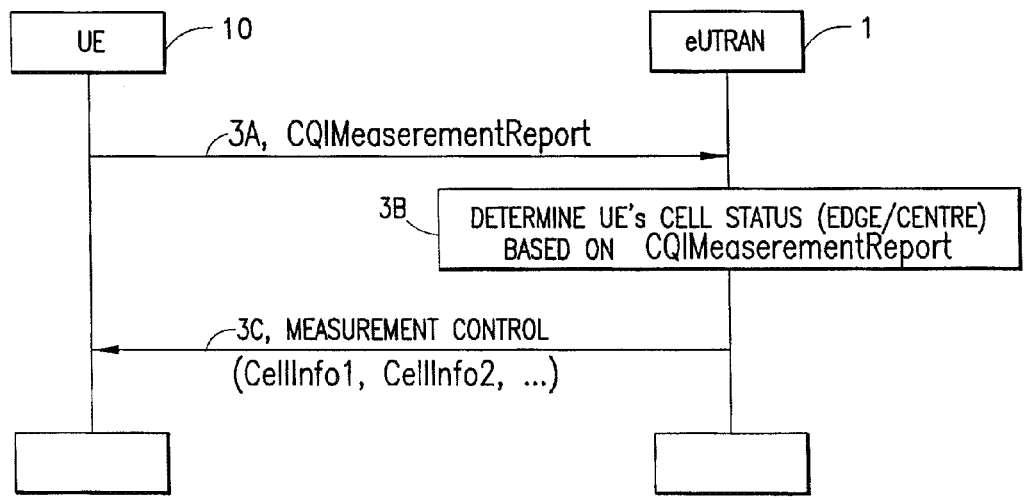
FIG. 3 is a message flow diagram that illustrates measurement control triggered by a CQI measurement report.

In addition to those situations that are particularly germane to eUTRAN, such as initial cell access and handover, other situations can be considered as well. For example, based on the CQI Measurement Report received from the UE 10, or other information such as Geometry or Pathloss, the eUTRAN system can classify the UE 10 into a new cell status (for example, either cell edge or cell center). If the UE 10 does not have any knowledge of the specifics of the network IC algorithm (i.e., the IC algorithm is transparent to the UE 10), it cannot change the sub-band to measure autonomously. Instead, the network (eNB 12) sends measurement control signaling to update the sub-band and frequency that the UE 10 should measure. This signaling is illustrated in FIG. 3, where in response to the CQI Measurement Report (3A), the network (e.g., the eNB 12) determines the UE cell status at 3B (e.g., edge or center), and sends at 3C corresponding Measurement Control information (CellInfo1, CellInfo2, . . . ) to the UE 10.

Note that even if the UE 10 has knowledge of the IC algorithm, it may still be useful to know the foregoing information in some situations. For example, for the case of a semi-static IC, the neighboring eNB 12' may "dynamically" change, e.g., the sub-band size (in the order of minutes). In this case it would be useful to provide the UE 10 with this information, even when the UE 10 has knowledge of the IC scheme.

Figure 5:
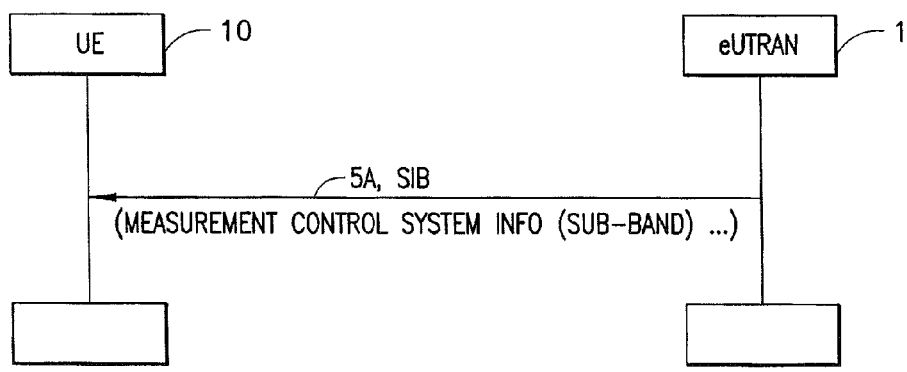
FIG. 5 is a message flow diagram that illustrates a concept of sub-band information contained in measurement control system information of a SIB.

Furthermore, the exemplary embodiments of this invention may also be implemented as an information element similar to the measurement control system information in UTRAN. In this case, and referring to FIG. 5, the eNB 12 specifies, via a SIB, a sub-band where all UEs 10 in the cell should make their measurements. This may imply that the eNB 10 is informed of a high power sub-band in the SIB since it is common for all UEs in the cell. In addition, a measurement frequency can be provided to each UE 10 separately via RRC signaling (MEASUREMENT CONTROL). By using the exemplary embodiments of this invention, it becomes possible for the network to design a flexible measurement scheme based on a different purpose for the measurement, and on the IC scheme.

A number of advantages can be realized by the use of the exemplary embodiments of this invention. For example, the use of the exemplary embodiments of this invention satisfy various LTE HO measurement requirements including the use of different measurement frequencies and different sub-bands. Further, the use of the exemplary embodiments of this invention make the measurement activity transparent to different IC schemes, including the use of no IC scheme, and to different HO measurement schemes.

Based on the foregoing it should be apparent that the exemplary embodiments of this invention provide a method, an apparatus, a device and computer program product(s) to enable a network element, such as the eNB 12, to specify to a UE those sub-bands in which to make a measurement.

The method, an apparatus, a device and computer program product(s) as in the previous paragraph, where the sub-bands are specified by indicating a first resource block, and one of a resource block step amount and a last resource block for non-contiguous resource blocks, or a resource block amount for contiguous resource blocks.

The method, an apparatus, a device and computer program product(s) as in the previous two paragraphs, used for at least one of inter-frequency, intra-frequency and inter-RAT measurements.

The method, an apparatus, a device and computer program product(s) as in the previous three paragraphs, where the sub-bands are specified using one of a measurement control message or a SIB.

The method, an apparatus, a device and computer program product(s) as in the previous paragraph, where for the case where the sub-bands are specified using the measurement control message, further comprising making a determination of the cell status of the UE.

The method, an apparatus, a device and computer program product(s) as in the previous paragraph, where the cell status is at least one of center of cell or edge of cell, and is based at least in part on a CQI measurement report received from the UE.

The method, an apparatus, a device and computer program product(s) as in the previous paragraphs, further comprising reporting the measurement results to the network element and using the measurement results for at least one of handover or cell re-selection purposes.

Based on the foregoing it should be apparent that the exemplary embodiments of this invention also provide a method, an apparatus, a device and computer program product(s) to enable a UE to receive from a network element, such as the eNB, information that specifies those sub-bands in which the UE is to make a measurement, and making measurements in the specified sub-bands.

The method, an apparatus, a device and computer program product(s) as in the previous paragraph, where the sub-bands are specified by indicating a first resource block, and one of a resource block step amount and a last resource block for non-contiguous resource blocks, or a resource block amount for contiguous resource blocks.

The method, an apparatus, a device and computer program product(s) as in the previous two paragraphs, used for making at least one of inter-frequency, intra-frequency and inter-RAT measurements.

The method, an apparatus, a device and computer program product(s) as in the previous three paragraphs, where the sub-bands are specified using one of a measurement control message or a SIB.

The method, an apparatus, a device and computer program product(s) as in the previous paragraphs, further comprising reporting the measurement results to the network element for use in at least one of handover or cell re-selection purposes.

The method, an apparatus, a device and computer program product(s) as in the previous paragraphs, further comprising the network element deciding when to transmit the information to the UE.

The method, an apparatus, a device and computer program product(s) as in the previous paragraphs, further comprising the network element using an update procedure instead of sending the information to the UE.

Below are described various non-limiting exemplary embodiments of the invention. While numbered for purposes of clarity, said numbering should not be construed as wholly separating the various embodiments as one or more aspects of one exemplary embodiment may be utilized in conjunction with one or more other aspects of another exemplary embodiment, as suitable.

Figure 8:
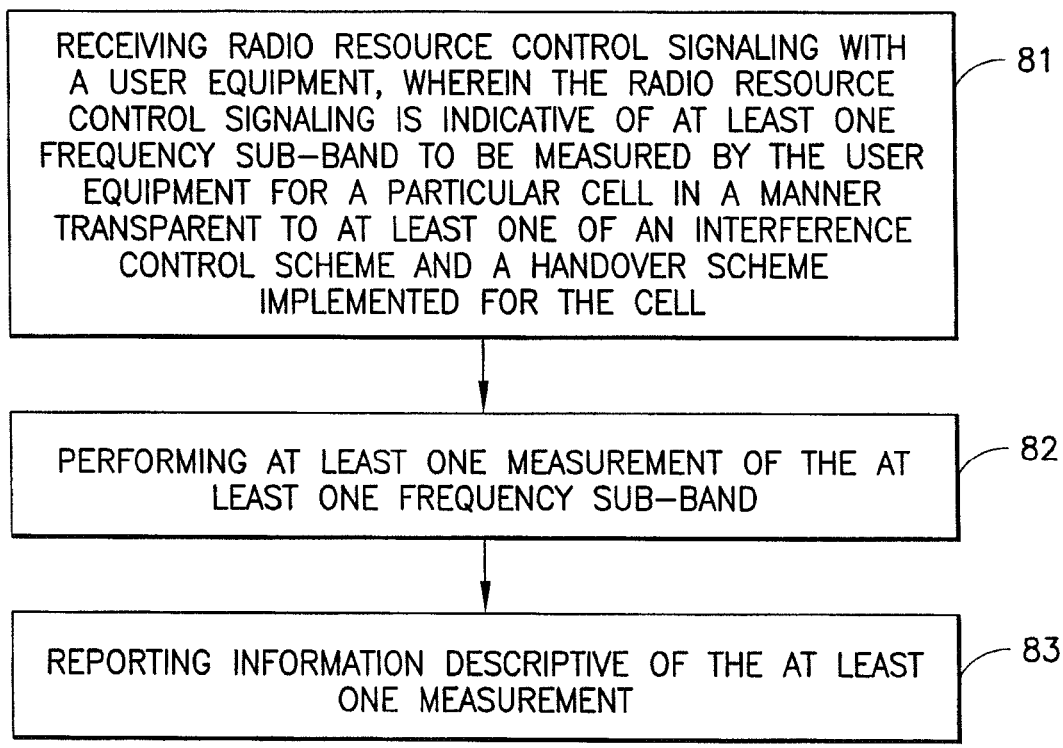
FIG. 8 depicts a flowchart illustrating one non-limiting example of a method for practicing the exemplary embodiments of this invention.

(1) In one non-limiting, exemplary embodiment, and as shown in FIG. 8, a method comprising: receiving radio resource control signaling with a user equipment, wherein the radio resource control signaling is indicative of at least one frequency sub-band to be measured by the user equipment for a particular cell in a manner transparent to at least one of an interference control scheme and a handover scheme implemented for the cell (box 81); performing at least one measurement of the at least one frequency sub-band (box 82); and reporting information descriptive of the at least one measurement (box 83).

A method as above, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block. A method as in any above, wherein the radio resource control signaling indicates the at least one frequency sub-band by indicating a first resource block and one of a resource block step amount and a last resource block for non-contiguous resource blocks, or a resource block amount for contiguous resource blocks. A method as in any above, wherein the at least one measurement is performed for use in at least one of handover or cell re-selection purposes. A method as in any above, wherein the radio resource control signaling is further indicative of a frequency for performing the at least one measurement. A method as in any above, further comprising: receiving measurement control signaling comprising an update to the at least one frequency sub-band. A method as in any above, wherein the user equipment comprises a mobile node in an evolved universal terrestrial radio access network.

A method as in any above, wherein the at least one measurement is performed for use in at least one of an inter-frequency handover, an intra-frequency handover or an inter-radio access technology handover. A method as in any above, wherein the radio resource control signaling comprises a SubBandInfo information element. A method as in any above, wherein the radio resource control signaling is indicative of a placement of the at least one sub-band in an entire bandwidth and a bandwidth of the at least one sub-band. A method as in any above, wherein a cell bandwidth and a resource block bandwidth are known a priori by the user equipment. A method as in any above, wherein the at least one of an interference control scheme and a handover scheme implemented for the cell provides for different sub-bands for intra-frequency, inter-frequency or inter-radio access technology handovers. A method as in any above, wherein the user equipment comprises a mobile phone. A method as in any above, wherein the method is implemented by a computer program. A method as in any above, wherein the method is implemented by a computer program executed by a processor of a user equipment.

(2) In another non-limiting, exemplary embodiment, a computer program product comprising program instructions embodied on a tangible computer-readable medium, execution of the program instructions resulting in operations comprising: receiving radio resource control signaling with a user equipment, wherein the radio resource control signaling is indicative of at least one frequency sub-band to be measured by the user equipment for a particular cell in a manner transparent to at least one of an interference control scheme and a handover scheme implemented for the cell; performing at least one measurement of the at least one frequency sub-band; and reporting information descriptive of the at least one measurement.

A computer program product as above, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block. A computer program product as in any above, wherein the radio resource control signaling indicates the at least one frequency sub-band by indicating a first resource block and one of a resource block step amount and a last resource block for non-contiguous resource blocks, or a resource block amount for contiguous resource blocks.

A computer program product as in any above, wherein the at least one measurement is performed for use in at least one of handover or cell re-selection purposes. A computer program product as in any above, wherein the radio resource control signaling is further indicative of a frequency for performing the at least one measurement. A computer program product as in any above, execution of the program instructions resulting in operations further comprising: receiving measurement control signaling comprising an update to the at least one frequency sub-band. A computer program product as in any above, wherein the user equipment comprises a mobile node in an evolved universal terrestrial radio access network.

A computer program product as in any above, wherein the at least one measurement is performed for use in at least one of an inter-frequency handover, an intra-frequency handover or an inter-radio access technology handover. A computer program product as in any above, wherein the radio resource control signaling comprises a SubBandInfo information element. A computer program product as in any above, wherein the radio resource control signaling is indicative of a placement of the at least one sub-band in an entire bandwidth and a bandwidth of the at least one sub-band. A computer program product as in any above, wherein a cell bandwidth and a resource block bandwidth are known a priori by the user equipment. A computer program product as in any above, wherein the at least one of an interference control scheme and a handover scheme implemented for the cell provides for different sub-bands for intra-frequency, inter-frequency or inter-radio access technology handovers. A computer program product as in any above, wherein the user equipment comprises a mobile phone.

(3) In another non-limiting, exemplary embodiment, an apparatus comprising: a receiver configurable to receive radio resource control signaling indicative of at least one frequency sub-band to be measured by the apparatus for a particular cell in a manner transparent to at least one of an interference control scheme and a handover scheme implemented for the cell; a data processor configurable to perform at least one measurement of the at least one frequency sub-band; and a transmitter configurable to report information descriptive of the at least one measurement.

An apparatus as above, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block. An apparatus as in any above, wherein the radio resource control signaling indicates the at least one frequency sub-band by indicating a first resource block and one of a resource block step amount and a last resource block for non-contiguous resource blocks, or a resource block amount for contiguous resource blocks.

An apparatus as in any above, wherein the data processor is configurable to perform the at least one measurement for use in at least one of handover or cell re-selection purposes. An apparatus as in any above, wherein the radio resource control signaling is further indicative of a frequency for performing the at least one measurement. An apparatus as in any above, wherein the receiver is further configurable to receive measurement control signaling comprising an update to the at least one frequency sub-band. An apparatus as in any above, wherein the apparatus comprises a user equipment in an evolved universal terrestrial radio access network. An apparatus as in any above, wherein the apparatus comprises a user equipment.

An apparatus as in any above, wherein the data processor is configurable to perform the at least one measurement for use in at least one of an inter-frequency handover, an intra-frequency handover or an inter-radio access technology handover. An apparatus as in any above, wherein the radio resource control signaling comprises a SubBandInfo information element. An apparatus as in any above, wherein the radio resource control signaling is indicative of a placement of the at least one sub-band in an entire bandwidth and a bandwidth of the at least one sub-band. An apparatus as in any above, wherein a cell bandwidth and a resource block bandwidth are known a priori by the user equipment. An apparatus as in any above, wherein the at least one of an interference control scheme and a handover scheme implemented for the cell provides for different sub-bands for intra-frequency, inter-frequency or inter-radio access technology handovers. An apparatus as in any above, wherein the apparatus comprises a mobile phone.

(4) In another non-limiting, exemplary embodiment, an apparatus comprising: means for receiving radio resource control signaling indicative of at least one frequency sub-band to be measured by the apparatus for a particular cell in a manner transparent to at least one of an interference control scheme and a handover scheme implemented for the cell; means for performing at least one measurement of the at least one frequency sub-band; and means for reporting information descriptive of the at least one measurement.

An apparatus as above, wherein the means for receiving comprises a receiver, the means for performing at least one measurement comprises a data processor, and the means for reporting comprises a transmitter. An apparatus as in any above, wherein the apparatus comprises a user equipment. An apparatus as in any above, wherein the apparatus comprises a mobile node in an evolved universal terrestrial radio access network. An apparatus as in any above, wherein the apparatus comprises a mobile phone.

Figure 9:
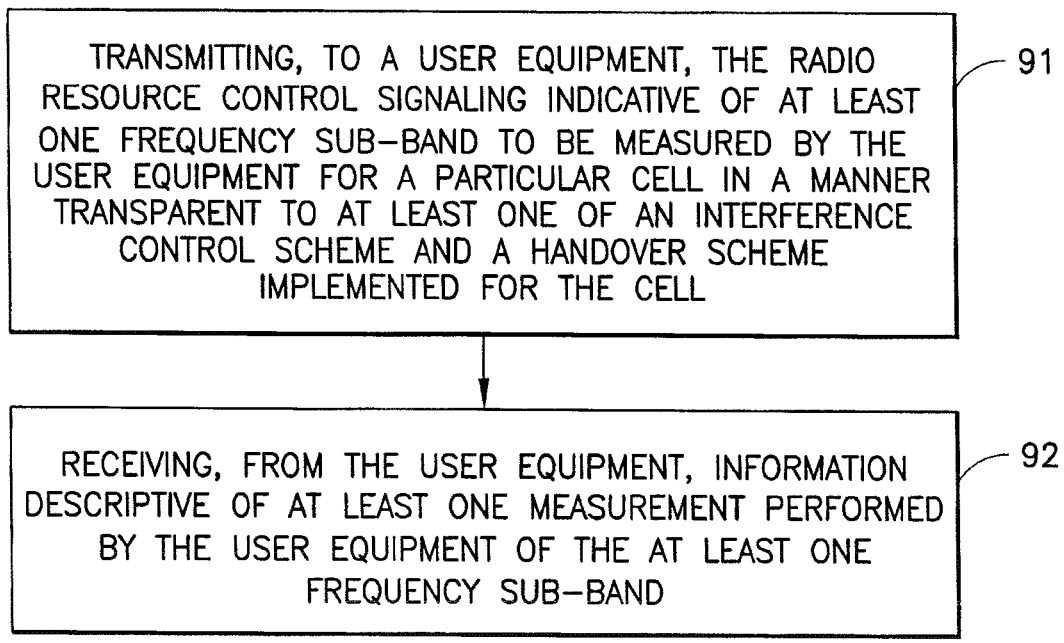
FIG. 9 depicts a flowchart illustrating another non-limiting example of a method for practicing the exemplary embodiments of this invention.

(5) In another non-limiting, exemplary embodiment, and as shown in FIG. 9, a method comprising: transmitting, to a user equipment, radio resource control signaling indicative of at least one frequency sub-band to be measured by the user equipment for a particular cell in a manner transparent to at least one of an interference control scheme and a handover scheme implemented for the cell (box 91); and receiving, from the user equipment, information descriptive of at least one measurement performed by the user equipment of the at least one frequency sub-band (box 92).

A method as above, further comprising: in response to receiving a channel quality indication measurement report, determining a user equipment cell status and sending to the user equipment measurement control information corresponding to the determined user equipment cell status. A method as in any above, further comprising: deciding when to transmit the radio resource control signaling, and wherein transmitting radio resource control signaling is performed in response to a positive decision. A method as in any above, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block.

A method as in any above, wherein the radio resource control signaling indicates the at least one frequency sub-band by indicating a first resource block and one of a resource block step amount and a last resource block for non-contiguous resource blocks, or a resource block amount for contiguous resource blocks. A method as in any above, wherein the at least one measurement is for use in at least one of handover or cell re-selection purposes. A method as in any above, wherein the radio resource control signaling is further indicative of a frequency for performing the at least one measurement. A method as in any above, further comprising: transmitting measurement control signaling comprising an update to the at least one frequency sub-band. A method as in any above, wherein the method is performed by a network element of an evolved universal terrestrial radio access network.

A method as in any above, wherein the at least one measurement is for use in at least one of an inter-frequency handover, an intra-frequency handover or an inter-radio access technology handover. A method as in any above, wherein the radio resource control signaling comprises a SubBandInfo information element. A method as in any above, wherein the radio resource control signaling is indicative of a placement of the at least one sub-band in an entire bandwidth and a bandwidth of the at least one sub-band. A method as in any above, wherein the at least one of an interference control scheme and a handover scheme implemented for the cell provides for different sub-bands for intra-frequency, inter-frequency or inter-radio access technology handovers. A method as in any above, wherein the method is performed by a base station. A method as in any above, wherein the method is implemented by a computer program. A method as in any above, wherein the method is implemented by a computer program executed by a processor of a network element.

(6) In another non-limiting, exemplary embodiment, a computer program product comprising program instructions embodied on a tangible computer-readable medium, execution of the program instructions resulting in operations comprising: transmitting, to a user equipment, radio resource control signaling indicative of at least one frequency sub-band to be measured by the user equipment for a particular cell in a manner transparent to at least one of an interference control scheme and a handover scheme implemented for the cell; and receiving, from the user equipment, information descriptive of at least one measurement performed by the user equipment of the at least one frequency sub-band.

A computer program product as above, execution of the program instructions resulting in operations further comprising: in response to receiving a channel quality indication measurement report, determining a user equipment cell status and sending to the user equipment measurement control information corresponding to the determined user equipment cell status. A computer program product as in any above, execution of the program instructions resulting in operations further comprising: deciding when to transmit the radio resource control signaling, and wherein transmitting radio resource control signaling is performed in response to a positive decision.

A computer program product as in any above, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block. A computer program product as in any above, wherein the radio resource control signaling is further indicative of a frequency for performing the at least one measurement. A computer program product as in any above, wherein the program instructions are executed by a network element of an evolved universal terrestrial radio access network.

A computer program product as in any above, wherein the radio resource control signaling indicates the at least one frequency sub-band by indicating a first resource block and one of a resource block step amount and a last resource block for non-contiguous resource blocks, or a resource block amount for contiguous resource blocks. A computer program product as in any above, wherein the at least one measurement is for use in at least one of an inter-frequency handover, an intra-frequency handover or an inter-radio access technology handover. A computer program product as in any above, further comprising: transmitting measurement control signaling comprising an update to the at least one frequency sub-band. A computer program product as in any above, wherein the at least one measurement is for use in at least one of handover or cell re-selection purposes. A computer program product as in any above, wherein the radio resource control signaling comprises a SubBandInfo information element. A computer program product as in any above, wherein the radio resource control signaling is indicative of a placement of the at least one sub-band in an entire bandwidth and a bandwidth of the at least one sub-band. A computer program product as in any above, wherein the at least one of an interference control scheme and a handover scheme implemented for the cell provides for different sub-bands for intra-frequency, inter-frequency or inter-radio access technology handovers. A computer program product as in any above, wherein the method is performed by a base station.

(7) In another non-limiting, exemplary embodiment, an apparatus comprising: a transmitter configurable to transmit, to a user equipment, radio resource control signaling indicative of at least one frequency sub-band to be measured by the user equipment for a particular cell in a manner transparent to at least one of an interference control scheme and a handover scheme implemented for the cell; and a receiver configurable to receive, from the user equipment, information descriptive of at least one measurement performed by the user equipment of the at least one frequency sub-band.

An apparatus as above, further comprising: a data processor configurable, in response to receiving a channel quality indication measurement report, to determine a user equipment cell status, wherein the transmitter is further configurable to send to the user equipment measurement control information corresponding to the determined user equipment cell status. An apparatus as in any above, further comprising: a data processor configurable to decide when to transmit the radio resource control signaling, and wherein the radio resource control signaling is transmitted by the transmitter in response to a positive decision by the data processor. An apparatus as in any above, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block. An apparatus as in any above, wherein the radio resource control signaling is further indicative of a frequency for performing the at least one measurement. An apparatus as in any above, wherein the apparatus comprises a network element of an evolved universal terrestrial radio access network. An apparatus as in any above, wherein the apparatus comprises a base station.

An apparatus as in any above, wherein the radio resource control signaling indicates the at least one frequency sub-band by indicating a first resource block and one of a resource block step amount and a last resource block for non-contiguous resource blocks, or a resource block amount for contiguous resource blocks. An apparatus as in any above, wherein the at least one measurement is for use in at least one of an inter-frequency handover, an intra-frequency handover or an inter-radio access technology handover. An apparatus as in any above, wherein the transmitter is further configurable to transmit measurement control signaling comprising an update to the at least one frequency sub-band. An apparatus as in any above, wherein the at least one measurement is for use in at least one of handover or cell re-selection purposes. An apparatus as in any above, wherein the radio resource control signaling comprises a SubBandInfo information element. An apparatus as in any above, wherein the radio resource control signaling is indicative of a placement of the at least one sub-band in an entire bandwidth and a bandwidth of the at least one sub-band. An apparatus as in any above, wherein the at least one of an interference control scheme and a handover scheme implemented for the cell provides for different sub-bands for intra-frequency, inter-frequency or inter-radio access technology handovers.

(8) In another non-limiting, exemplary embodiment, an apparatus comprising: means for transmitting, to a user equipment, radio resource control signaling indicative of at least one frequency sub-band to be measured by the user equipment for a particular cell in a manner transparent to at least one of an interference control scheme and a handover scheme implemented for the cell; and means for receiving, from the user equipment, information descriptive of at least one measurement performed by the user equipment of the at least one frequency sub-band.

An apparatus as above, wherein the means for transmitting comprises a transmitter and the means for receiving comprises a receiver. An apparatus as in any above, wherein the apparatus comprises a base station. An apparatus as in any above, wherein the apparatus comprises a network element of an evolved universal terrestrial radio access network.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a frill and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
    transmitting, to a user equipment, radio resource control signaling indicative of at least one frequency sub-band to be measured by the user equipment for a particular cell in a manner transparent to at least one of an interference control scheme and a handover scheme implemented for the cell, wherein the radio resource control signaling is further indicative of how frequently the user equipment is to perform at least one measurement of the at least one frequency sub-band, wherein the radio resource control signaling indicates the at least one frequency sub-band by indicating a first resource block and one of a resource block step amount and a last resource block for non-contiguous resource blocks, or a resource block amount for contiguous resource blocks, wherein the radio resource control signaling comprises a measurement control message that operates to inform the user equipment of all measurement requirements under an interference control scheme that is being utilized for the particular cell, wherein the interference control scheme provides for different sub-bands for inter-frequency measurements and intra-frequency measurements and wherein the interference control scheme further provides for different measurement frequencies regarding how frequently devices are to perform measurements of frequency sub-bands; and
    receiving, from the user equipment, information descriptive of at least one measurement performed by the user equipment of the at least one frequency sub-band.

2. A method as in claim 1, further comprising: in response to receiving a channel quality indication measurement report, determining a user equipment cell status and sending to the user equipment measurement control information corresponding to the determined user equipment cell status.

3. A method as in claim 1, further comprising: deciding when to transmit the radio resource control signaling, and wherein transmitting radio resource control signaling is performed in response to a positive decision.

4. A method as in claim 1, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block.

5. A method as in claim 1, wherein the at least one measurement is for use in at least one of handover or cell re-selection purposes.

6. A method as in claim 1, further comprising: transmitting measurement control signaling comprising an update to the at least one frequency sub-band.

7. A method as in claim 1, wherein the method is performed by a network element of an evolved universal terrestrial radio access network.

8. A computer program product comprising a non-transitory computer-readable storage medium bearing computer program code embodied therein for use with a computer, the computer program code comprising:
    code for transmitting, to a user equipment, radio resource control signaling indicative of at least one frequency sub-band to be measured by the user equipment for a particular cell in a manner transparent to at least one of an interference control scheme and a handover scheme implemented for the cell, wherein the radio resource control signaling is further indicative of how frequently the user equipment is to perform at least one measurement of the at least one frequency sub-band, wherein the radio resource control signaling indicates the at least one frequency sub-band by indicating a first resource block and one of a resource block step amount and a last resource block for non-contiguous resource blocks, or a resource block amount for contiguous resource blocks, wherein the radio resource control signaling comprises a measurement control message that operates to inform the user equipment of all measurement requirements under an interference control scheme that is being utilized for the particular cell, wherein the interference control scheme provides for different sub-bands for inter-frequency measurements and intra-frequency measurements and wherein the interference control scheme further provides for different measurement frequencies regarding how frequently devices are to perform measurements of frequency sub-bands; and
    code for receiving, from the user equipment, information descriptive of at least one measurement performed by the user equipment of the at least one frequency sub-band.

9. A computer program product as in claim 8, execution of the program instructions resulting in operations further comprising: in response to receiving a channel quality indication measurement report, determining a user equipment cell status and sending to the user equipment measurement control information corresponding to the determined user equipment cell status.

10. A computer program product as in claim 8, execution of the program instructions resulting in operations further comprising: deciding when to transmit the radio resource control signaling, and wherein transmitting radio resource control signaling is performed in response to a positive decision.

11. A computer program product as in claim 8, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block.

12. A computer program product as in claim 8, wherein the program instructions are executed by a network element of an evolved universal terrestrial radio access network.

13. An apparatus comprising:
a transmitter for transmitting, to a user equipment, radio resource control signaling indicative of at least one frequency sub-band to be measured by the user equipment for a particular cell in a manner transparent to at least one of an interference control scheme and a handover scheme implemented for the cell, wherein the radio resource control signaling is further indicative of how frequently the user equipment is to perform at least one measurement of the at least one frequency sub-band, wherein the radio resource control signaling indicates the at least one frequency sub-band by indicating a first resource block and one of a resource block step amount and a last resource block for non-contiguous resource blocks, or a resource block amount for contiguous resource blocks, wherein the radio resource control signaling comprises a measurement control message that operates to inform the user equipment of all measurement requirements under an interference control scheme that is being utilized for the particular cell, wherein the interference control scheme provides for different sub-bands for inter-frequency measurements and intra-frequency measurements and wherein the interference control scheme further provides for different measurement frequencies regarding how frequently devices are to perform measurements of frequency sub-bands; and
a receiver for receiving, from the user equipment, information descriptive of at least one measurement performed by the user equipment of the at least one frequency sub-band.

14. An apparatus as in claim 13, further comprising: a data processor for determining, in response to receiving a channel quality indication measurement report, a user equipment cell status, wherein the transmitter sends to the user equipment measurement control information corresponding to the determined user equipment cell status.

15. An apparatus as in claim 13, further comprising: a data processor for deciding when to transmit the radio resource control signaling, and wherein the radio resource control signaling is transmitted by the transmitter in response to a positive decision by the data processor.

16. An apparatus as in claim 13, wherein the radio resource control signaling comprises one of: a measurement control message, an evolved universal terrestrial radio access measurement control message, a measurement control system information message, a system information block Type 11, a system information block Type 12, neighbor list information, an intra-frequency cell information list, an inter-frequency cell information list, or a neighbor list distribution message in a system information block.

17. An apparatus as in claim 13, wherein the apparatus comprises a network element of an evolved universal terrestrial radio access network.

18. An apparatus as in claim 13, wherein the apparatus comprises a base station.

* * * * *